US012784384B2

(12) United States Patent
Hashimoto et al.

(10) Patent No.: US 12,784,384 B2
(45) Date of Patent: Nov. 3, 2026

(54) MOBILE INFORMATION TERMINAL AND DISPLAY METHOD FOR SAME

(71) Applicant: Maxell, Ltd., Kyoto (JP)

(72) Inventors: Yasunobu Hashimoto, Kyoto (JP); Hitoshi Akiyama, Kyoto (JP); Kazuhiko Yoshizawa, Kyoto (JP); Mayumi Nakade, Kyoto (JP); Nobuo Masuoka, Kyoto (JP)

(73) Assignee: Maxell, Ltd., Kyoto (JP)

( * ) Notice: Subject to any disclaimer, the term of this patent is extended or adjusted under 35 U.S.C. 154(b) by 446 days.

(21) Appl. No.: 18/284,346

(22) PCT Filed: Mar. 29, 2021

(86) PCT No.: PCT/JP2021/013384
§ 371 (c)(1),
(2) Date: Apr. 8, 2024

(87) PCT Pub. No.: WO2022/208628
PCT Pub. Date: Oct. 6, 2022

(65) Prior Publication Data
US 2024/0242453 A1 Jul. 18, 2024

(51) Int. Cl.
*G06T 19/20* (2011.01)
*G01S 5/02* (2010.01)
*G06F 3/01* (2006.01)

(52) U.S. Cl.
CPC ............ *G06T 19/20* (2013.01); *G01S 5/0284* (2013.01); *G06F 3/011* (2013.01);
(Continued)

(58) Field of Classification Search
CPC ......... G06T 19/20; G06F 3/011; G01S 5/0284
(Continued)

(56) References Cited

U.S. PATENT DOCUMENTS 9,087,245 B2 7/2015 Murakami et al.
2007/0265799 A1 11/2007 Yamada
(Continued)

FOREIGN PATENT DOCUMENTS

JP 2007-298441 A 11/2007
JP 2010-515044 A 5/2010
(Continued)

OTHER PUBLICATIONS

International Search Report of PCT/JP2021/013384 dated Jun. 8, 2021.

*Primary Examiner* — Harry K Liu
(74) *Attorney, Agent, or Firm* — Mattingly & Malur, PC

(57) ABSTRACT

A mobile information terminal is provided with: a radio receiving device that receives a radio signal of a radio wave source; a sensor that measures an amount of movement and an amount of rotation of the terminal; a display device; and a control device. The control device is configured to estimate the position of the radio wave source from the receiving strength of the radio wave source received by the radio receiving device, and the amount of movement and the amount of rotation of the terminal measured by the sensor; and display, on the display device, a graphical guide display superimposed on an external world image, the graphical guide display expressing a three-dimensional direction and distance representing a relative positional relationship of the estimated position of the radio wave source when viewed from the position of the mobile information terminal.

19 Claims, 18 Drawing Sheets

(52) U.S. Cl.
CPC .. *G06T 2200/24* (2013.01); *G06T 2219/2004* (2013.01); *G06T 2219/2016* (2013.01)

(58) Field of Classification Search
USPC .......................................................... 342/450
See application file for complete search history.

(56) References Cited

U.S. PATENT DOCUMENTS

| | | | | |
|---|---|---|---|---|
| 2009/0309787 | A1* | 12/2009 | Gildea | G01C 21/3641 342/357.31 |
| 2011/0234879 | A1* | 9/2011 | Kashitani | G06F 3/012 348/333.02 |
| 2014/0365980 | A1* | 12/2014 | Morrison | G06F 3/0485 715/863 |
| 2018/0372830 | A1 | 12/2018 | Schuehler et al. | |
| 2021/0279913 | A1* | 9/2021 | Hortop | G06T 11/00 |
| 2025/0249339 | A1* | 8/2025 | Mullen | A63B 71/0622 |
| 2026/0017853 | A1* | 1/2026 | Tada | G06T 11/26 |

FOREIGN PATENT DOCUMENTS

| | | | |
|---|---|---|---|
| JP | 2012-198833 | A | 10/2012 |
| JP | 2014-126380 | A | 7/2014 |
| JP | 2014-142721 | A | 8/2014 |
| JP | 2017-142180 | A | 8/2017 |
| JP | 2019-039877 | A | 3/2019 |
| JP | 2019-512671 | A | 5/2019 |
| WO | 2019/052998 | A1 | 3/2019 |

* cited by examiner

MOBILE INFORMATION TERMINAL AND DISPLAY METHOD FOR SAME

TECHNICAL FIELD

This invention relates to a mobile information terminal for radio wave source search that estimates and displays the position of radio wave sources such as RF tags and beacons.

BACKGROUND ART

Patent Document 1 is a background art in the technical field related to position estimation of radio wave sources. The Patent Document 1 discloses that the position of the mobile terminal is moved and the strength of the received radio wave received from a transmitter and the position of the mobile terminal itself on the receiving side are measured at different positions, and the position of the transmitter is estimated by integrating the received radio wave strength and receiving side position information as the measurement results obtained at multiple positions, and the position of the estimated radio wave source is displayed superimposed on the two-dimensional map information.

CITATION LIST

Patent Document

Patent Document 1: JP 2017-142180 A

SUMMARY OF THE INVENTION

Problems to be Solved by the Invention

In Patent Document 1, since it is necessary to indicate a position on a two-dimensional map, there is a problem that it cannot be used in an environment in which map information cannot be obtained. In addition, in indoor environments where indoor positioning is not available, the position of the radio wave source is also not known on the map because the position of the own terminal on the map is not known. Furthermore, there are cases where there are physical objects that are not shown on the map information, and the estimated position of the radio wave source is difficult to understand because of the hidden objects. In addition, there is a problem that information about the height of the radio wave source is missing.

In consideration of the problems described above, an object of the present invention is to provide a mobile information terminal and its display method that presents the estimated radio wave source position to a user in an easy-to-understand manner when searching for a radio wave source.

Solutions to Problems

According to an example of the present invention, a mobile information terminal is provided with: a radio receiving device that receives a radio signal of a radio wave source; a sensor that measures an amount of movement and an amount of rotation of the terminal; a display device; and a control device. The control device is configured to estimate the position of the radio wave source from the receiving strength of the radio wave source received by the radio receiving device, and the amount of movement and the amount of rotation of the terminal measured by the sensor; and display, on the display device, a graphical guide display superimposed on an external world image, the graphical guide display expressing a three-dimensional direction and distance representing a relative positional relationship of the estimated position of the radio wave source when viewed from the position of the mobile information terminal.

Effects of the Invention

According to the present invention, it is possible to provide a mobile information terminal and its display method that presents the estimated radio wave source position to the user in an easy-to-understand manner when searching for a radio wave source.

MODE FOR CARRYING OUT THE INVENTION

Hereinafter, Examples of the present invention will be described by using the drawings.

Example 1

Figure 1:
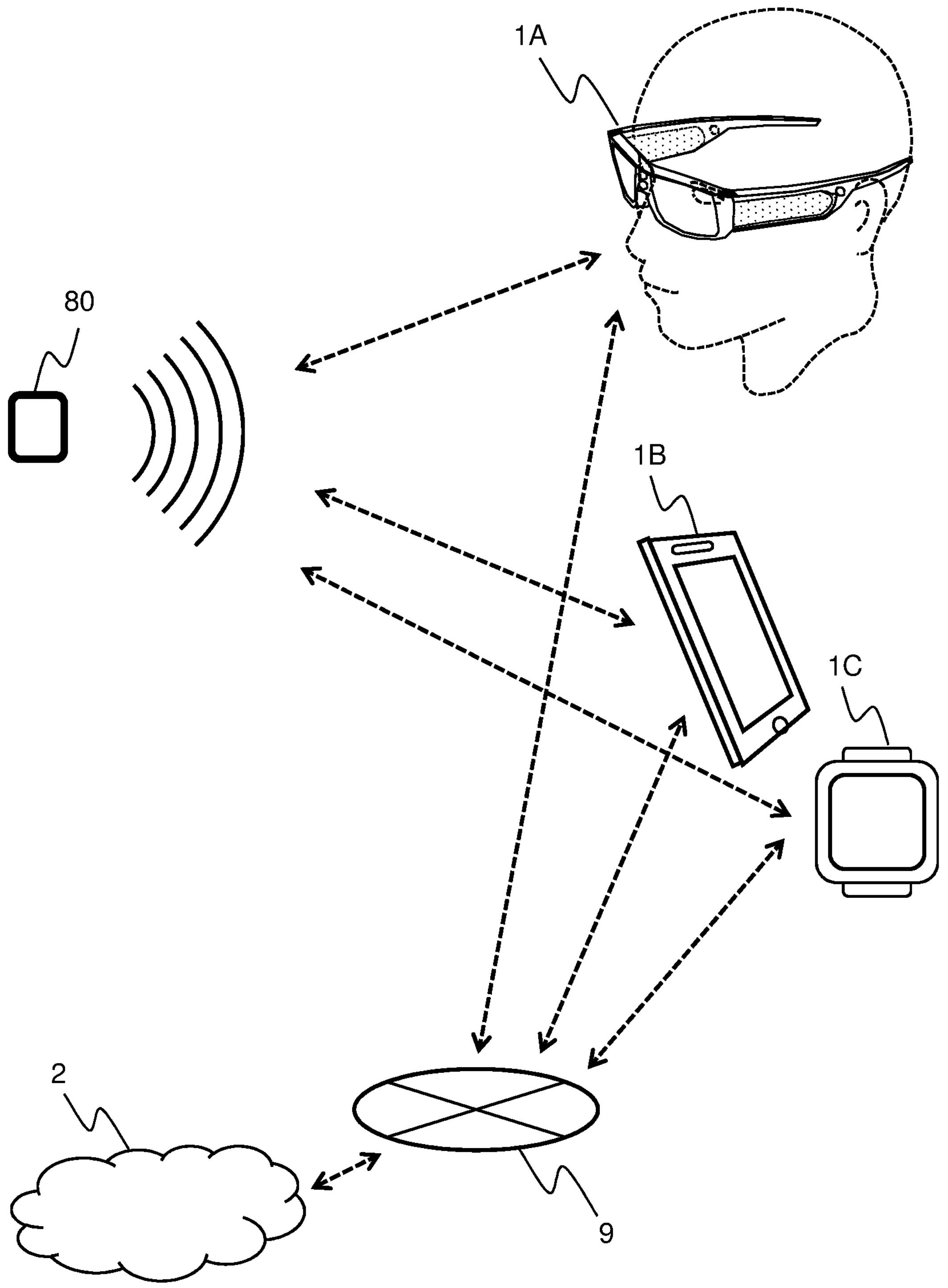
FIG. 1 is a schematic configuration diagram of a radio wave source search system in Example 1.

FIG. 1 is a schematic configuration diagram of a radio wave source search system in this example. In FIG. 1, the radio wave source search system has, as mobile information terminals for searching and estimating the position of the radio wave source 80, at least one of, for example, a mobile information terminal 1A that is an HMD (Head Mounted Display), a mobile information terminal 1B that is a smartphone, and a mobile information terminal 1C that is a smartwatch. The radio wave source searching operation of the mobile information terminals described below may be performed by these mobile information terminals independently or in cooperation with each other. In the following description, mobile information terminals 1A to 1C are collectively referred to as mobile information terminal 1. Also, the mobile information terminal may be simply described as a terminal.

Server 2 acts on behalf of each mobile information terminal 1 for processing, mediates transmission and reception of information between the mobile information terminals 1, and provides necessary information, via communication network 9. The server 2 is, for example, a local server, a cloud server, an edge server, a network service, or the like, and its form does not matter.

Figure 2A:
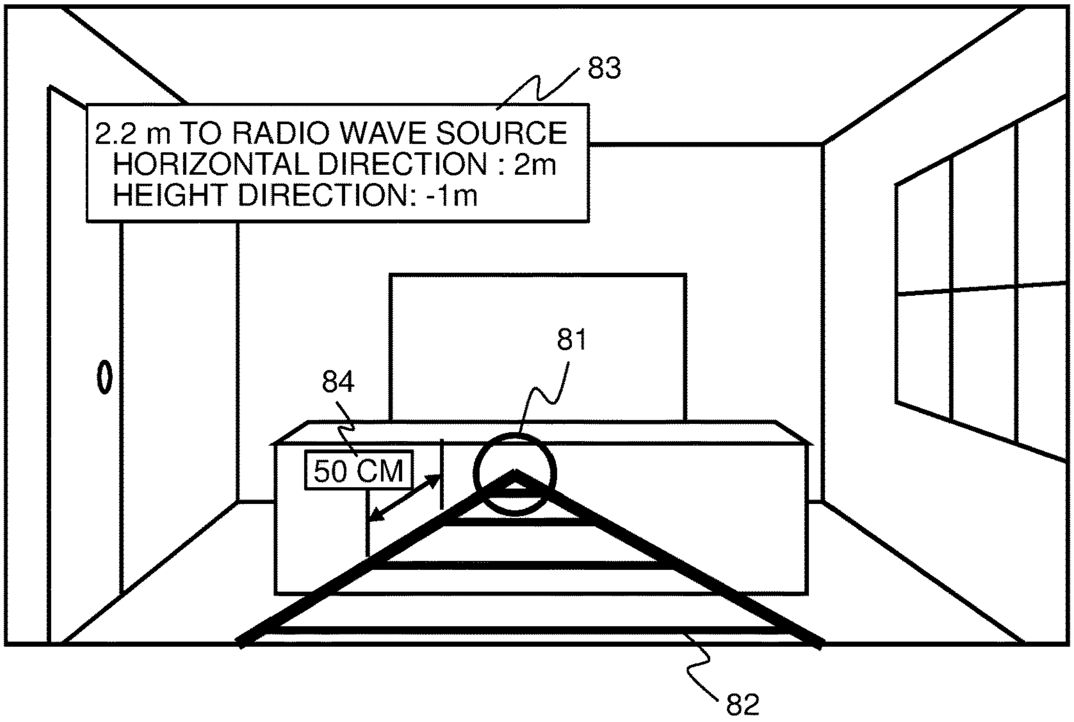
FIG. 2A is a display example of a radio wave source estimated position when a mobile information terminal is an HMD in Example 1.

FIG. 2A is a display example of an estimated radio wave source position when the mobile information terminal is an HMD in this example. In FIG. 2A, the outer frame represents the field of view of the user when the HMD is optical see-through, and the field of view of the display when the HMD is video see-through.

As shown in FIG. 2A, the circle indicated by 81 is the mark position for displaying the radio wave source estimated position (hereafter referred to as the radio wave source estimated position 81), and the guide 82 is an object that intuitively shows the perspective from the wearer of the HMD to the radio wave source estimated position 81. For example, as shown in FIG. 2A, the guide 82 should be an object that shows a fixed interval. In addition, the radio wave source estimated position 81 and the guide 82 are superimposed on the image of the external world and displayed. Thus, the display of the radio wave source estimated position in this example superimposes a graphic guide display showing the three-dimensional direction and distance of the relative position of the radio wave source estimated position, along with the radio wave source estimated position, on the external world image and displayed. In addition, in FIG. 2A, the distance to the radio wave source estimated position may be displayed as indicated by 83. Further, as indicated by 84, the distance between points that serve as a guide of distance may be indicated.

Figure 2B:
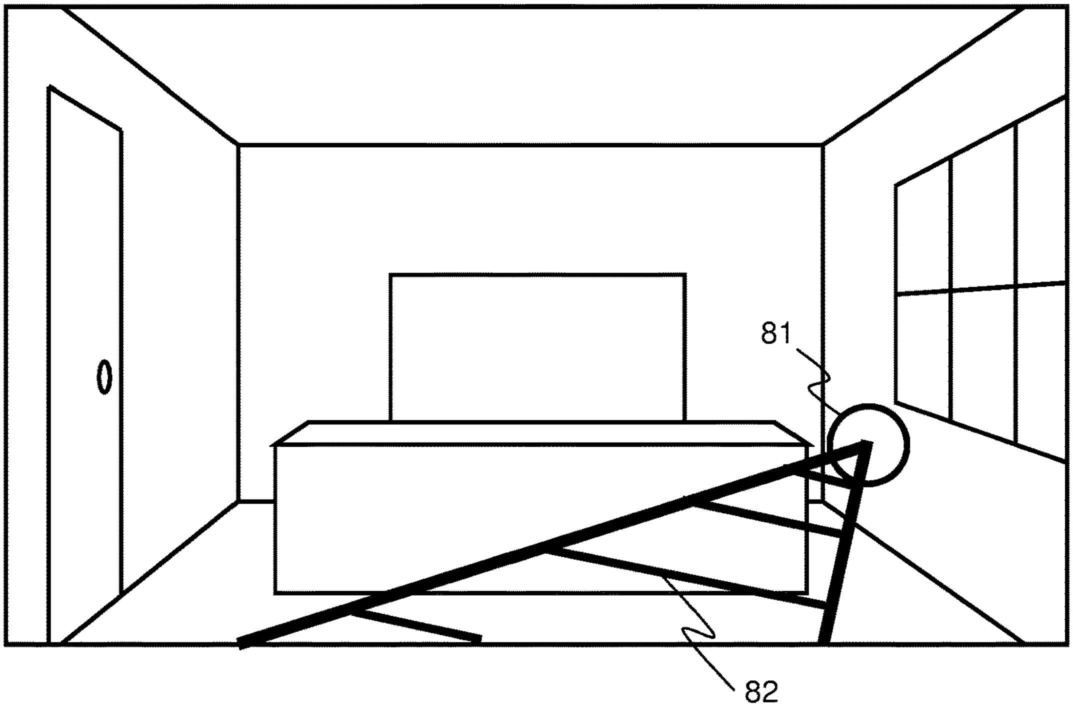
FIG. 2B is a display example of the radio wave source estimated position when the position of the radio wave source changes in FIG. 2A.

In addition, FIG. 2B is a display example of the radio wave source estimated position when the position of the radio wave source changes in FIG. 2A. As shown in FIG. 2B, by aligning the display position of the tip of the guide 82 with the radio wave source estimated position 81 in the field of view, that is, overlapping it, the position of the estimated radio wave source position is emphasized and becomes easier to understand. In addition, since the distance to the target is known, it is easier to recognize the position even when it is hidden by objects.

Figure 3:
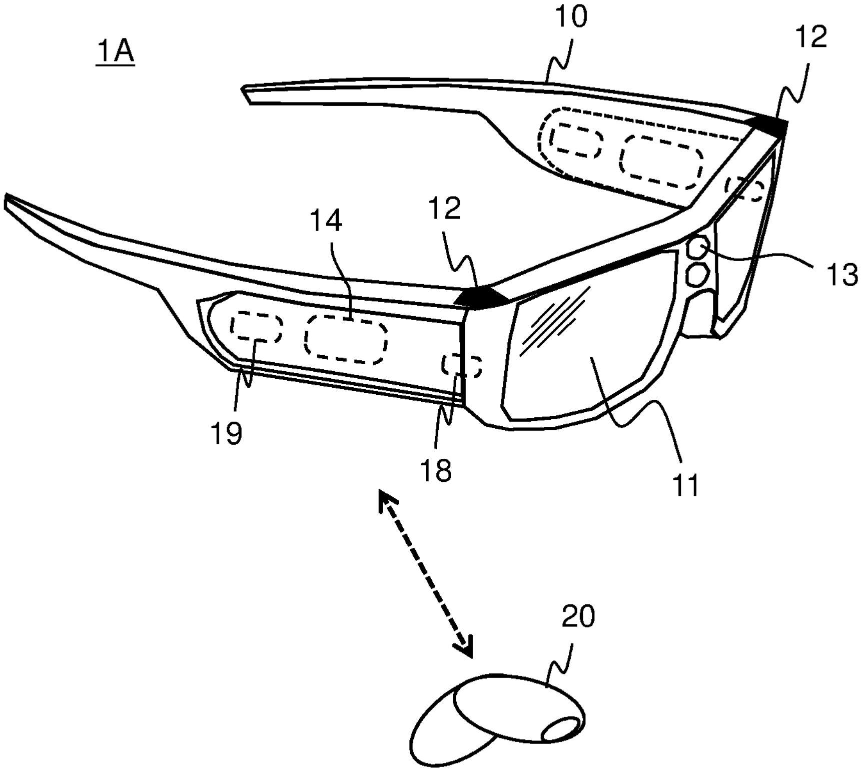
FIG. 3 is an external configuration example of an HMD as an example of the mobile information terminal in Example 1.

FIG. 3 is an external configuration example of an HMD as an example of the mobile information terminal in this example. In FIG. 3, the mobile information terminal 1A, which is an HMD, has a display device including a display surface 11 in a glasses-shaped housing 10. This display device is, for example, a transmissive display device, and a real image of the external world is transmitted to the display surface 11, and an image is displayed to be superimposed on the real image. The housing 10 is mounted with a control unit, a camera 12, a ranging sensor 13, another sensor unit 14, and the like.

The camera 12, for example, includes two cameras disposed on both of right and left sides of the housing 10, and captures a range including the front of the HMD and acquires an image. The ranging sensor 13 is a sensor that measures a distance between the HMD and an object of the external world. As the ranging sensor 13, a time of flight (TOF) type sensor may be used, or a stereo camera or other types of sensors may be used. The sensor unit 14 includes a sensor group for detecting the state of the position and the direction of the HMD. A sound input device 18 including a microphone, a sound output device 19 including a speaker or an earphone terminal, and the like are provided on the right side and the left side of the housing 10.

A operation device 20 such as a remote controller may be attached to the mobile information terminal 1A, which is an HMD. In this case, the HMD, for example, performs near-field wireless communication with respect to the operation device 20. The user is capable of inputting an instruction relevant to the function of the HMD, moving a cursor, or the like on the display surface 11 by manipulating manually the operation device 20. The HMD may communicate and cooperate with an external smartphone, an external PC, or the like. For example, the HMD may receive image data of augmented reality (AR) from an application of the smartphone.

The mobile information terminal 1A, which is an HMD, may display a virtual image of AR or the like on the display surface 11. For example, the mobile information terminal 1A, which is an HMD, generates a virtual image for guiding the user, and displays the virtual image on the display surface 11.

Figure 4:
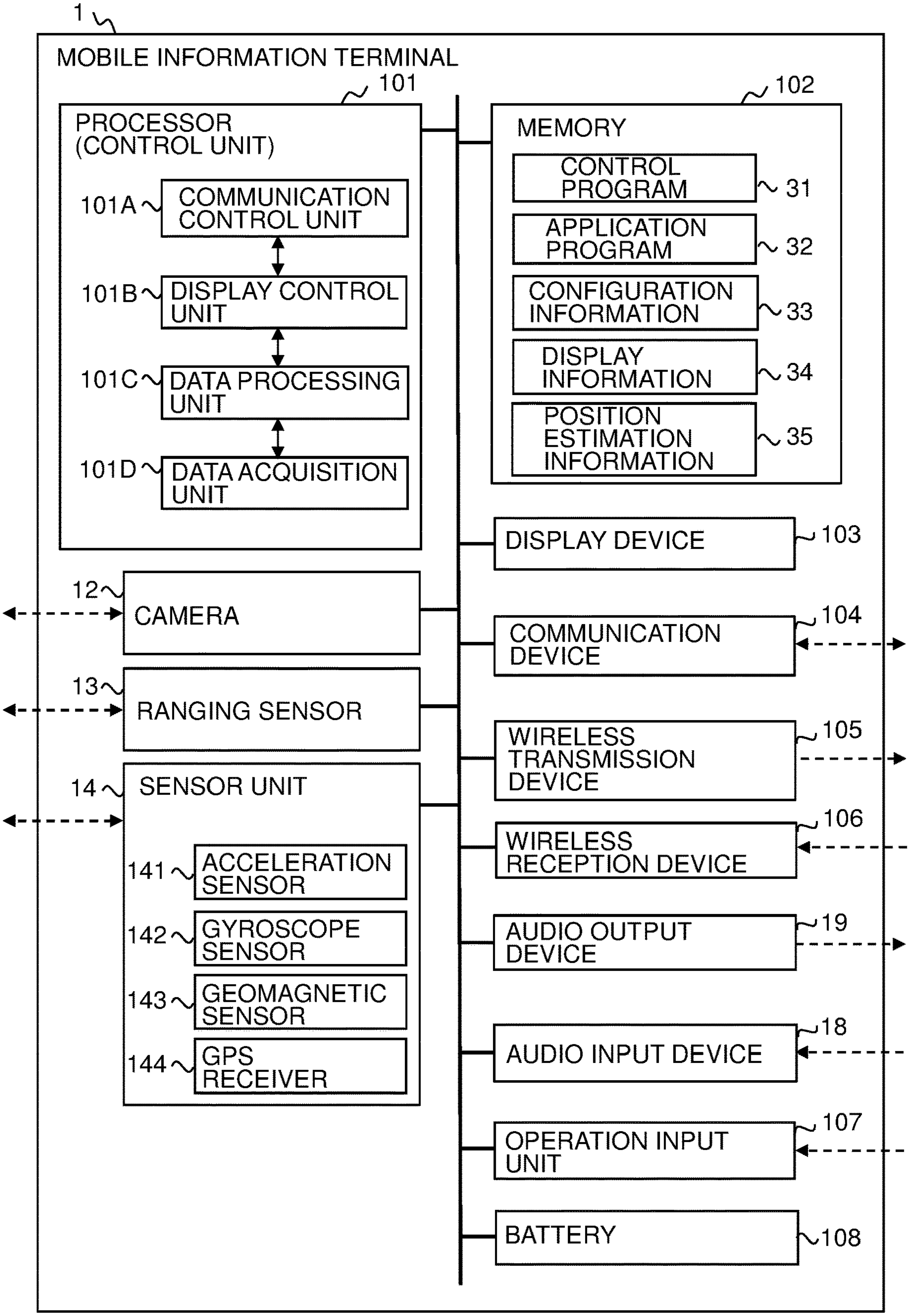
FIG. 4 is a functional block configuration example of the mobile information terminal (HMD) in Example 1.

FIG. 4 is a functional block configuration example of the mobile information terminal 1A, which is an HMD in FIG. 3. Basically, the other mobile information terminal 1 also has the same configuration. The mobile information terminal 1 includes a processor 101, a memory 102, the camera 12, the ranging sensor 13, the sensor unit 14, a display device 103, a communication device 104, the sound input device 18 including a microphone, the sound output device 19 including a speaker or the like, a wireless transmission device 105, a wireless reception device 106, an operation input unit 107, a battery 108, and the like. Such elements are connected to each other through a bus or the like.

The processor 101 includes a CPU, a ROM, a RAM, and the like, and configures the control unit of the HMD. The processor 101 attains the function of an OS, middleware, an application, or the like and other functions by executing processing according to a control program 31 or an application program 32 of the memory 102. The memory 102 includes a non-volatile storage device and the like, and stores various data or information pieces that are handled by the processor 101 or the like. In the memory 102, the image acquired by the camera 12 or the like, detection information, and the like are stored as temporary information.

The camera 12 converts light incident from a lens into an electrical signal with an imaging element, and acquires an image. For example, in the case of using a time of flight (TOF) sensor, the ranging sensor 13 calculates a distance from an object from a time for light exiting to the external world to hit the object and return. The sensor unit 14, for example, includes an acceleration sensor 141, a gyroscope sensor (an angular velocity sensor) 142, a geomagnetic sensor 143, and a GPS receiver 144. The sensor unit 14 detects the state of the position, the direction, the motion, or the like of the HMD by using the detection information of the sensor. The HMD is not limited thereto, and may include an illumination sensor, a proximity sensor, a pressure sensor, and the like.

The display device 103 includes a display driving circuit or the display surface 11, and displays the virtual image or the like on the display surface 11, on the basis of image data of display information 34. Note that, the display device 103 is not limited to a transmissive display device, and may be a non-transmissive display device or the like.

The communication device 104 includes a communication processing circuit, an antenna, and the like corresponding to various predetermined communication interfaces. Examples of the communication interface include a mobile network, Wi-Fi (Registered Trademark), Bluetooth (Registered Trademark), an infrared ray, and the like. The communication device 104 performs wireless communication processing or the like with respect to the other mobile information terminal 1 or an access point. The communication device 104 also performs near-field communication processing with respect to the operation device.

The wireless transmission device 105 transmits a radio signal of the radio wave source associated with an identification signal used for estimating the position. Here, the radio signal associated with the identification information, for example, is a signal of Bluetooth or the like. The wireless reception device 106 receives the radio signal of the radio wave source associated with the identification signal, and measures the reception intensity. Information communication may be performed by using the wireless transmission device 105 and the wireless reception device 106. In addition, in the case of the mobile information terminal 1 that only transmits or receives the radio signal, required devices may be provided.

The sound input device 18 converts an input sound from a microphone into sound data. The sound output device 19 outputs sound from a speaker or the like, on the basis of the sound data. The sound input device may have a sound recognition function. The sound output device may have a sound synthesis function. The operation input unit 107 receives manipulation input with respect to the HMD, for example, the on/off of a power source, volume adjustment, and the like, and includes a hardware button, a touch sensor, and the like. The battery 108 supplies power to each unit.

A control unit of the processor 101 includes a communication control unit 101A, a display control unit 101B, a data processing unit 101C, and a data acquisition unit 101D, as a configuration example of a function block that is attained by the processing.

In the memory 102, the control program 31, the application program 32, setting information 33, the display information 34, position estimation information 35, and the like are stored. The control program 31 is a program for attaining the estimation of the relative positional relationship between the mobile information terminals 1. The application program 32 is a program for attaining a guide function for the user. The setting information 33 includes system setting information or user setting information according to each function. The display information 34 includes the image data for displaying the virtual image on the display surface 11, or position coordinate information. The position estimation information 35 is, for estimating the position, information according to the movement distance of the mobile information terminal 1, the orientation of the mobile information terminal 1 with respect to the external world, and the reception intensity of the radio signal.

The communication control unit 101A controls communication processing using the communication device 104 when performing communication with respect to the other mobile information terminal 1 and the like. The display control unit 101B controls the display of the virtual image or the like on the display surface 11 of the display device 103 by using the display information 34.

The data processing unit 101C reads and writes the position estimation information 35, and estimates the relative positional relationship between own device and other terminal (partner terminal).

The data acquisition unit 101D acquires the intensity of the radio signal from the wireless reception device 106, and acquires each detection data piece from various sensors such as the camera 12, the ranging sensor 13, and the sensor unit 14. The data acquisition unit 101D estimates the own position from the detection data of the various sensor, and measures the movement distance.

Figure 5:
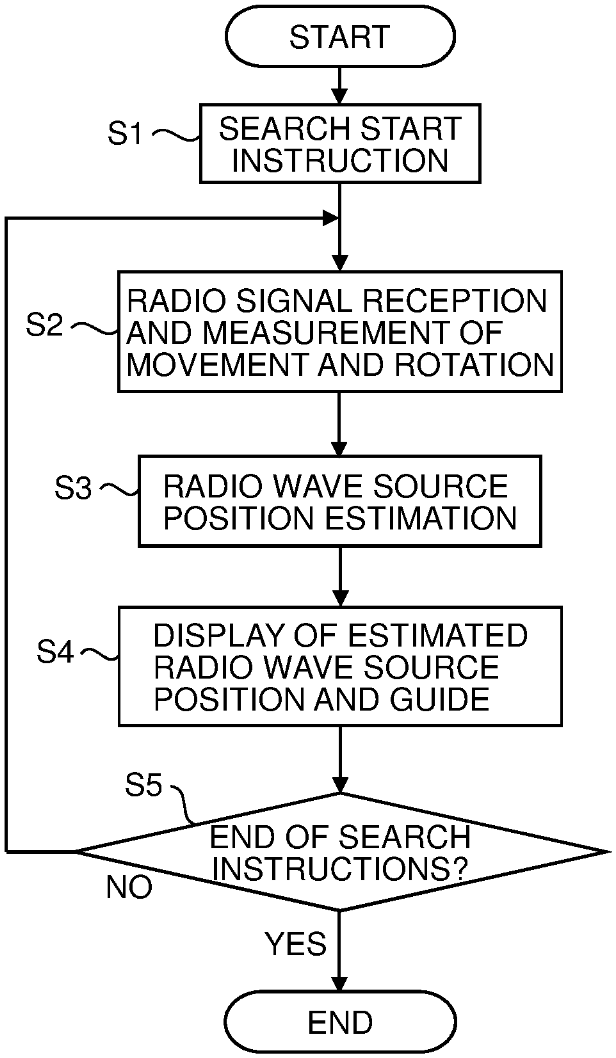
FIG. 5 is a processing flow diagram of a radio wave source search in Example 1.

FIG. 5 is a processing flow diagram of a radio wave source search in this example. In FIG. 5, the mobile information terminal 1 first receives a search start instruction in step S1, and then receives a radio signal of the radio wave source with the wireless reception device 106 in step S2. Since this is the basis for understanding the relative positional relationship between the radio wave source in the external world and the own terminal, the mobile information terminal 1 must constantly measure changes in the position and orientation of the own terminal in the external world. Therefore, in step S2 as well, the mobile information terminal 1 measures the amount of movement of its own terminal and the amount of rotation, which is the change in orientation, from the data detected by the sensor of the sensor unit 14 in FIG. 4. Then, in step S3, processor 101 estimates the position of the radio wave source and displays the estimated position of the radio wave source and the guide in step S4. Then, the process of steps S2 to S4 is continued until an instruction to end the search is received, and the display of the estimated position of the radio wave source and the display of the guide continue to be updated. In this way, while moving in search of the radio wave source, the position of the radio wave source is estimated at any time, and the display of the estimated position of the radio wave source and the display of the guide are continuously updated.

To estimate the position of the radio wave source by integrating measurements at multiple positions, it is necessary to know the relationship between the present and past positions and orientations of the own terminal. Since the mobile information terminal 1 always knows the changes in the movement and orientation of the own terminal relative to the external world from the measurement of the amount of movement and the amount of rotation of the own terminal in step S2, it can also know the relationship between the position and orientation of the own terminal in the present and in the past.

One example of a method for estimating the position of the radio wave source is as follows.

The received strength of a radio wave is inversely proportional to the square of the distance when the reflected wave is sufficiently small. Using a function representing this characteristic, the position of the radio wave source can be estimated by performing least-squares fitting from the data of multiple points. That is, the received strength P is calculated as follows.

$$P = k/\{(X - X_0)^2 + (Y - Y_0)^2 + (Z - Z_0)^2\}$$

where k: coefficient dependent on radio wave source strength, $(X_0, Y_0, Z_0)$: radio wave source position, (X, Y, Z): receiving position.

Therefore, the received strength P is measured at several receiving positions and k and $(X_0, Y_0, Z_0)$ i.e. the radio wave source position is obtained by parameter fitting. When the reflected waves are strong, errors occur, but as one gets closer to the radio wave source, the reflected waves become relatively weaker, thus improving the accuracy of the estimation.

Another example of a method for estimating the position of the radio wave source is as follows.

Figure 6:
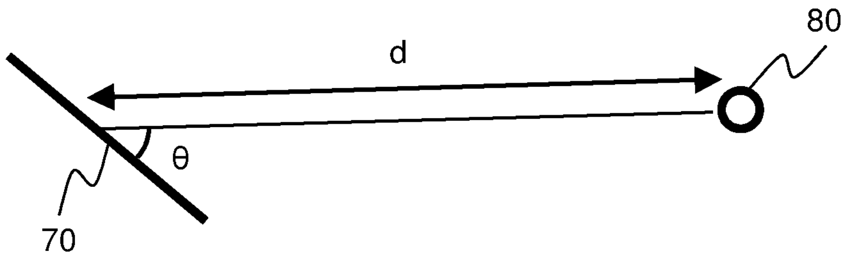
FIG. 6 is an explanatory diagram of estimating the direction of the radio wave source in Example 1.

Using UWB (Ultra Wide Band) technology, the position of the radio wave source can be estimated using measurements from a single position. FIG. 6 is an explanatory diagram of estimating the direction of the radio wave source. In FIG. 6, the direction θ of the radio wave source 80 with respect to the array plane 70 of the antennas can be found by the AOA (Angle of Arrival) method. In conjunction with this, the position of the radio wave source can be found by the distance information d from the radio wave source.

The distance to the radio wave source can be found by, for example, the following two methods.

(1) If there is time synchronization of terminals, measurement of the arrival time of radio waves.

(2) Measure the time it takes for the radio wave source to reply to a trigger sent from the terminal side.

The above method may also use the average of the estimated radio wave source positions at multiple positions to reduce errors.

Figure 7:
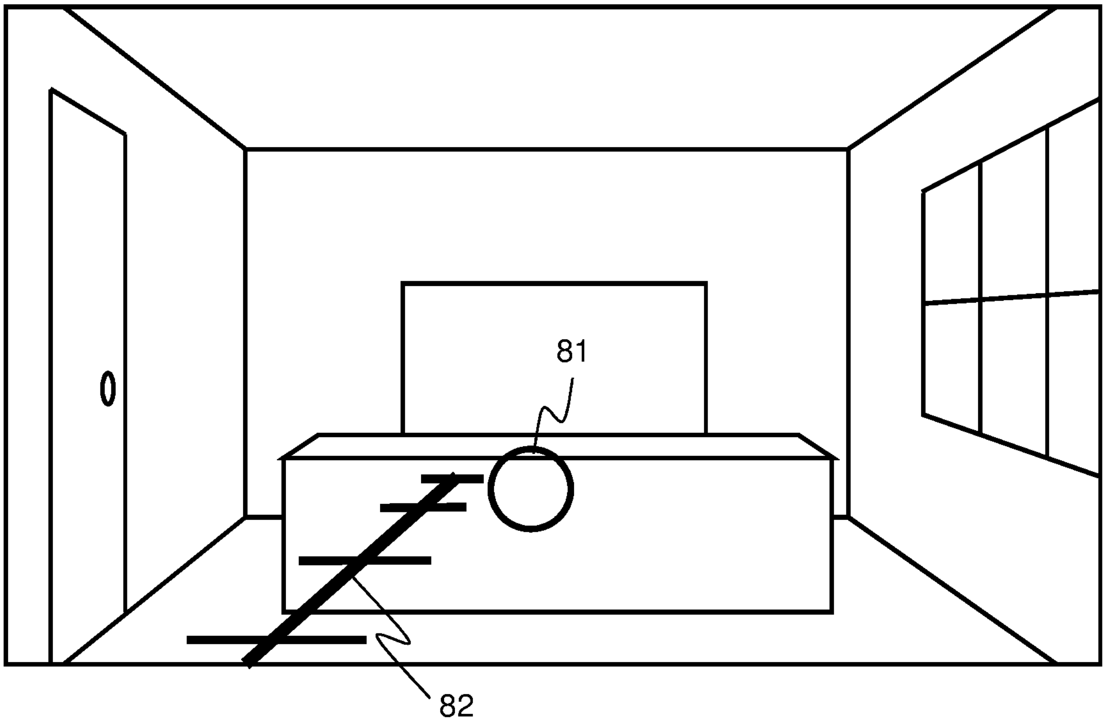
FIG. 7 is a modification of the display of the radio wave source estimated position in Example 1.

FIG. 7 is a modification of the display of the radio wave source estimated position in this example. In FIG. 7, if the guide 82 is displayed avoiding the line from the wearer of the HMD to the radio wave source estimated position 81, the path to the radio wave source estimated position 81 can be seen well, so the tip position of the guide 82 may be removed from the mark position displaying the radio wave source estimation position and displayed to the side. In other words, the tip of the guide 82 may not overlap the display of the radio wave source estimation position.

As described above, in this example, the three-dimensional relative positional relationship of the radio wave source estimated position from the mobile information terminal carried by the user including the HMD, that is, a graphical guide display indicating a three-dimensional direction and distance from the position of the mobile information terminal is displayed superimposed on the external world image. This allows the user to intuitively understand the relationship between the actual appearance of the external world and the position of the radio wave source, making it easier to recognize the position of the radio wave source.

As described above, according to this example, it is possible to provide a mobile information terminal and its display method for presenting the estimated radio wave source position to the user in an easy-to-understand manner when searching for the radio wave source.

Example 2

Figure 8:
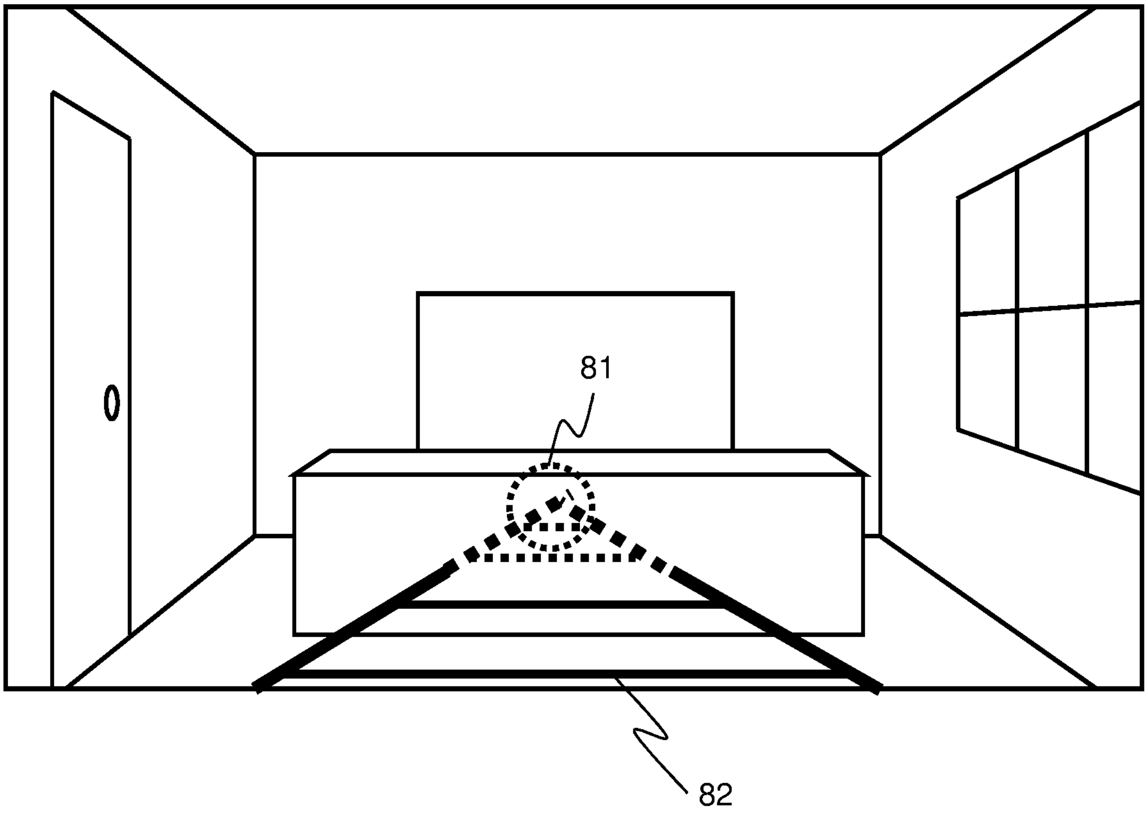
FIG. 8 is a display example of the radio wave source estimated position in Example 2.

FIG. 8 is a display example of the radio wave source estimated position in this example.

As shown in FIG. 8, when the radio wave source estimated position is in a position that cannot be directly confirmed from the exterior, such as hidden behind an object or inside a bag, etc., the portion of the guide 82 that is shielded by the object of the external world is displayed in a different format from the other portions. That is, in FIG. 8, the shielded portion is indicated by dotted lines and the non-shielded portion is indicated by solid lines so that the display of the guide 82 also reflects the shielding relationship with a real object in the external world. In addition, as other display examples, the display is performed by different densities, different colors, or the like. Also, the radio wave source estimated position 81 may be similarly displayed in a different format such as dotted line display. This has the effect of making the positional relationship between the radio wave source estimated position and objects in the external world easier to understand.

Figure 9:
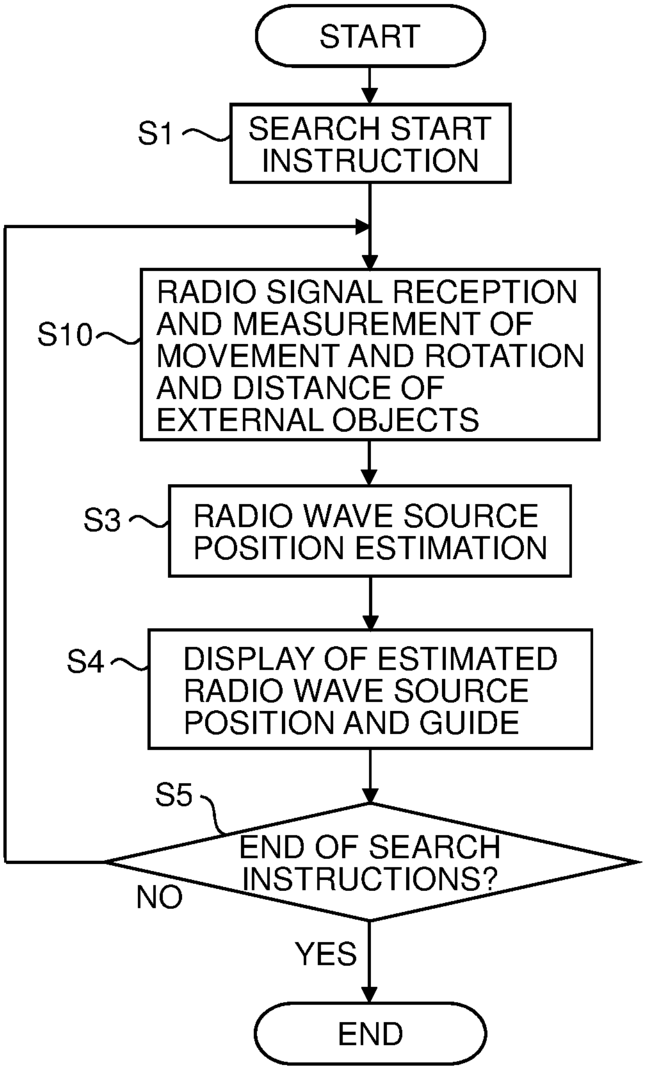
FIG. 9 is a processing flow diagram of radio wave source search in Example 2.

FIG. 9 is a processing flow diagram of radio wave source search in this example. In FIG. 9, the same processes as in FIG. 5 are indicated with the same symbols, and their explanations are omitted. In FIG. 9, the difference from FIG. 5 is that step S2 is replaced with step S10. That is, in step S10, in order to reflect the shielding relationship in the display of the guide 82, the measurement of the distance to the object of external world is added to the processing of step S2.

Example 3

In this example, when there is anisotropy in the error of the radio wave source estimated position, the point of displaying the radio wave source estimated position is displayed in a three-dimensional format reflecting the anisotropy will be described.

Figure 10:
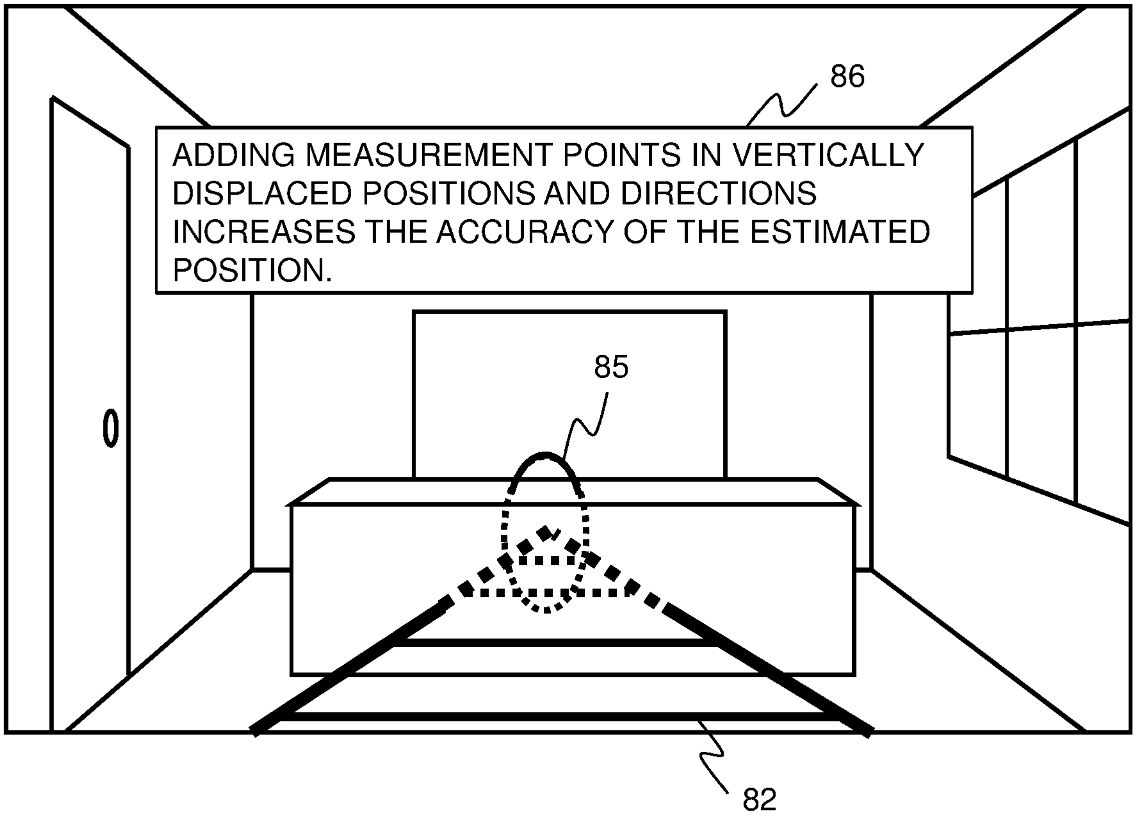
FIG. 10 is a display example of the radio wave source estimated position in Example 3.

FIG. 10 is a display example of the radio wave source estimated position in this example.

In the case of one of the above methods of estimating the position of the radio wave source, which is a method of fitting using the least-squares method from data at multiple points, if the measurement is performed while moving on a horizontal plane, the vertical measurement position may lose its spread and the vertical position estimation error may become large. In such cases, as shown in FIG. 10, the radio wave source estimated position is indicated by a mark 85 with a shape that extends in the vertical direction, the direction in which the error is large. In other words, the error range of the radio wave source estimated position is displayed including the differences due to the three-dimensional direction.

This provides an indication of the error as well as a reference when increasing the number of measurement positions. Guidance 86 for specific additional measurement points to reduce the error in the radio wave source estimated position may also be displayed.

Example 4

In this example, in a shopping center, etc., when there are multiple target radio wave sources, such as when searching for the location of multiple stores based on radio wave beacons installed in multiple stores, an example of displaying multiple radio wave source estimated positions with a guide will be described.

Figure 11:
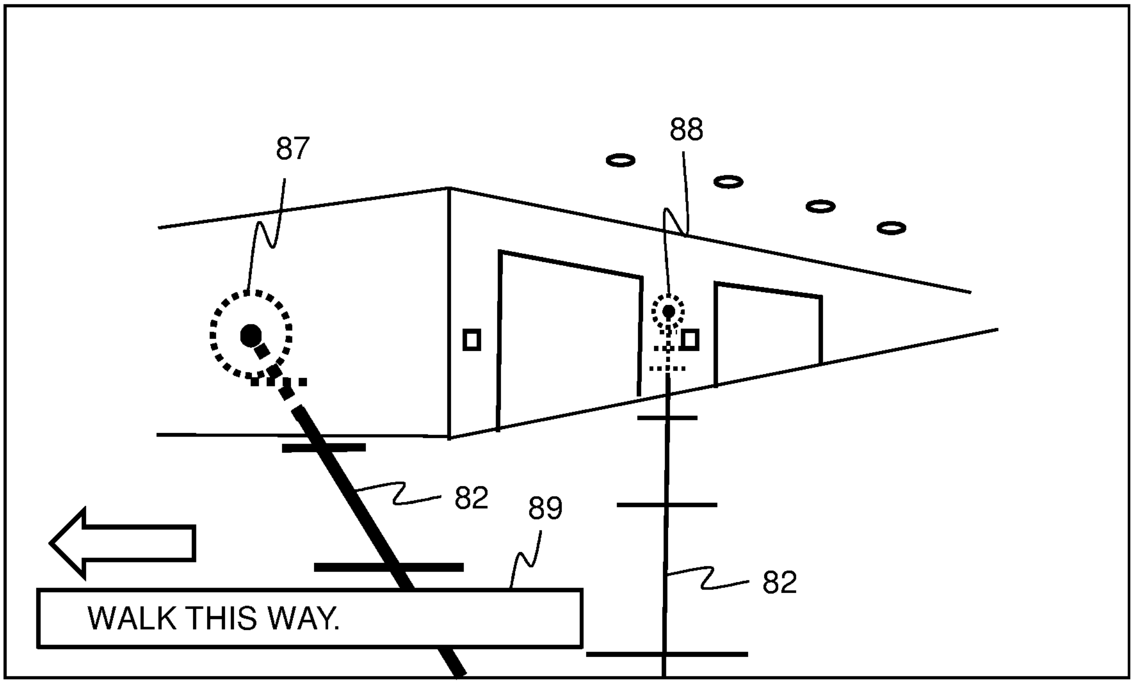
FIG. 11 is a display example of the radio wave source estimated position in Example 4.

FIG. 11 is a display example of the radio wave source estimated position in this example. In FIG. 11, multiple radio wave sources are distinguished and measured according to the ID information of the radio wave source contained in the radio signal, for example, the first and second radio wave source estimated positions 87 and 88, respectively, are displayed.

A variety of display methods may be used. That is, the estimated positions and guides may be displayed in different ways depending on the distance difference due to perspective of the radio wave source estimated position. In FIG. 11, the farther away the radio wave source is, the smaller the size of the mark indicating the radio wave source estimated position (the far second radio wave source estimated position 88 is made smaller than the near first radio wave source estimated position 87), and the lines of the guide 82 are also thinned. The color may be changed depending on the perspective. Furthermore, only the guides to the near radio wave sources may be displayed so that the external world can be seen clearly.

If map information is available, the mobile information terminal 1 may also display a guide 89 to the direction of movement to reach the radio wave source as an AR object. This will help the user to feel more secure, as the user will be able to grasp the distance to the target point by displaying a guide to the direction of movement as well as a guide to the distance to the radio wave source. This guidance is effective even when there is only one radio wave source. If there are multiple radio wave sources, the user may be guided in a route to go around from the nearest radio wave source. The map information may be recorded in the mobile information terminal or obtained from server 2.

According to this example, multiple radio wave source estimated positions can be checked at once, which improves convenience.

Example 5

In this example, an example will be described in which a smart phone estimates the position of the radio wave source, and an HMD displays the radio wave source estimated position and the guide.

Figure 12:
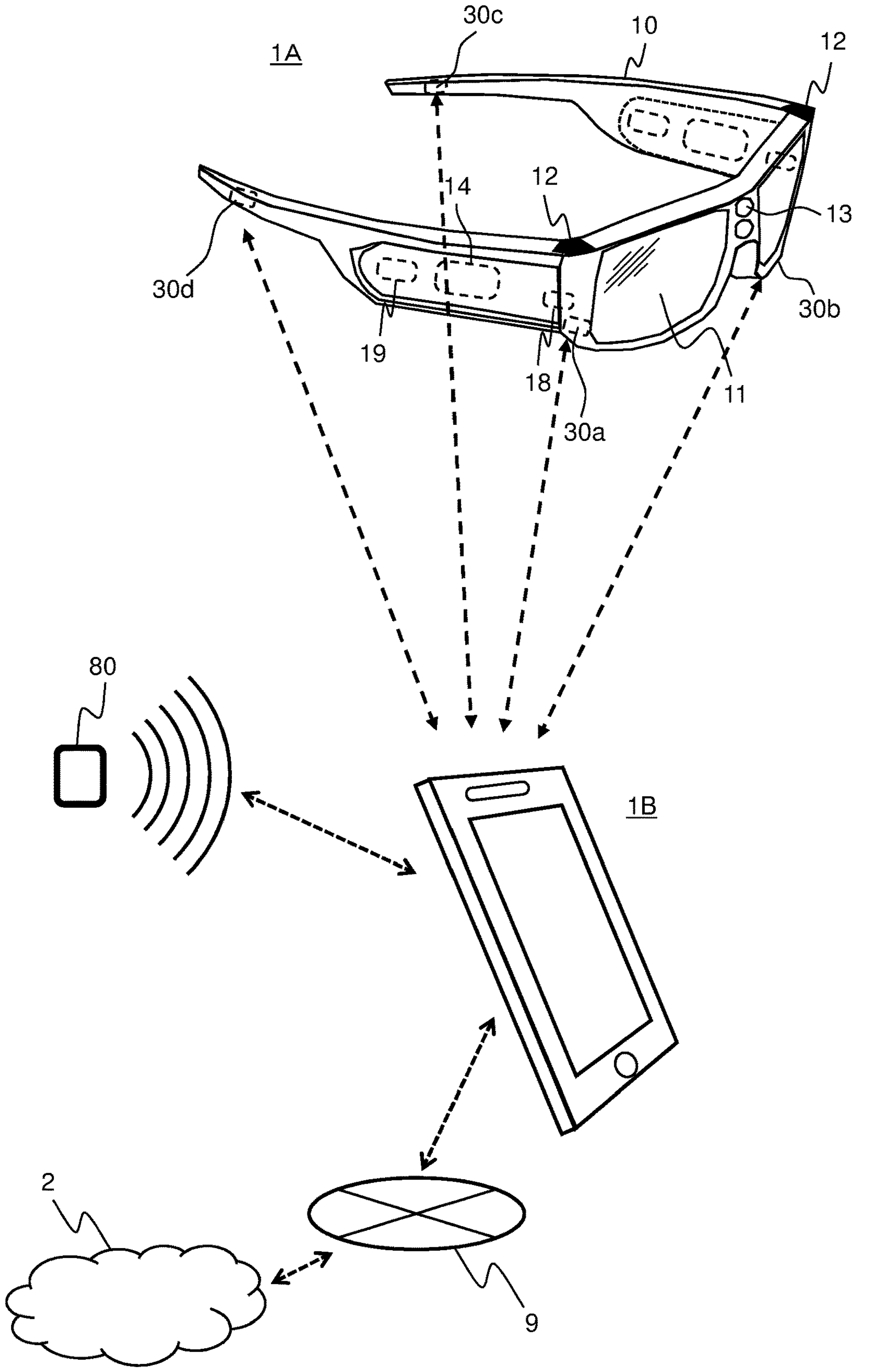
FIG. 12 is a schematic configuration diagram of the radio wave source search system in Example 5.

FIG. 12 is a schematic configuration diagram of the radio wave source search system in this example. In FIG. 12, the same configurations as in FIGS. 1 and 3 are marked with the same symbols, and their descriptions are omitted. In FIG. 12, the difference from FIGS. 1 and 3 is that four radio wave sources (30*a*-30*d*) are mounted on the HMD 1A.

As shown in FIG. 12, in this example, three or more UWB radio wave sources are mounted on the HMD 1A to measure the positional relationship between the smartphone 1B and the HMD 1A, and the radio wave source positions are measured from the smartphone. FIG. 12 shows an example of four radio wave sources mounted (30*a*-30*d*). From the information on the positional relationship between smartphone 1B and HMD 1A, the target radio wave source positions measured by smartphone 1B are converted to positions in the coordinate system of HMD 1A.

Figure 13:
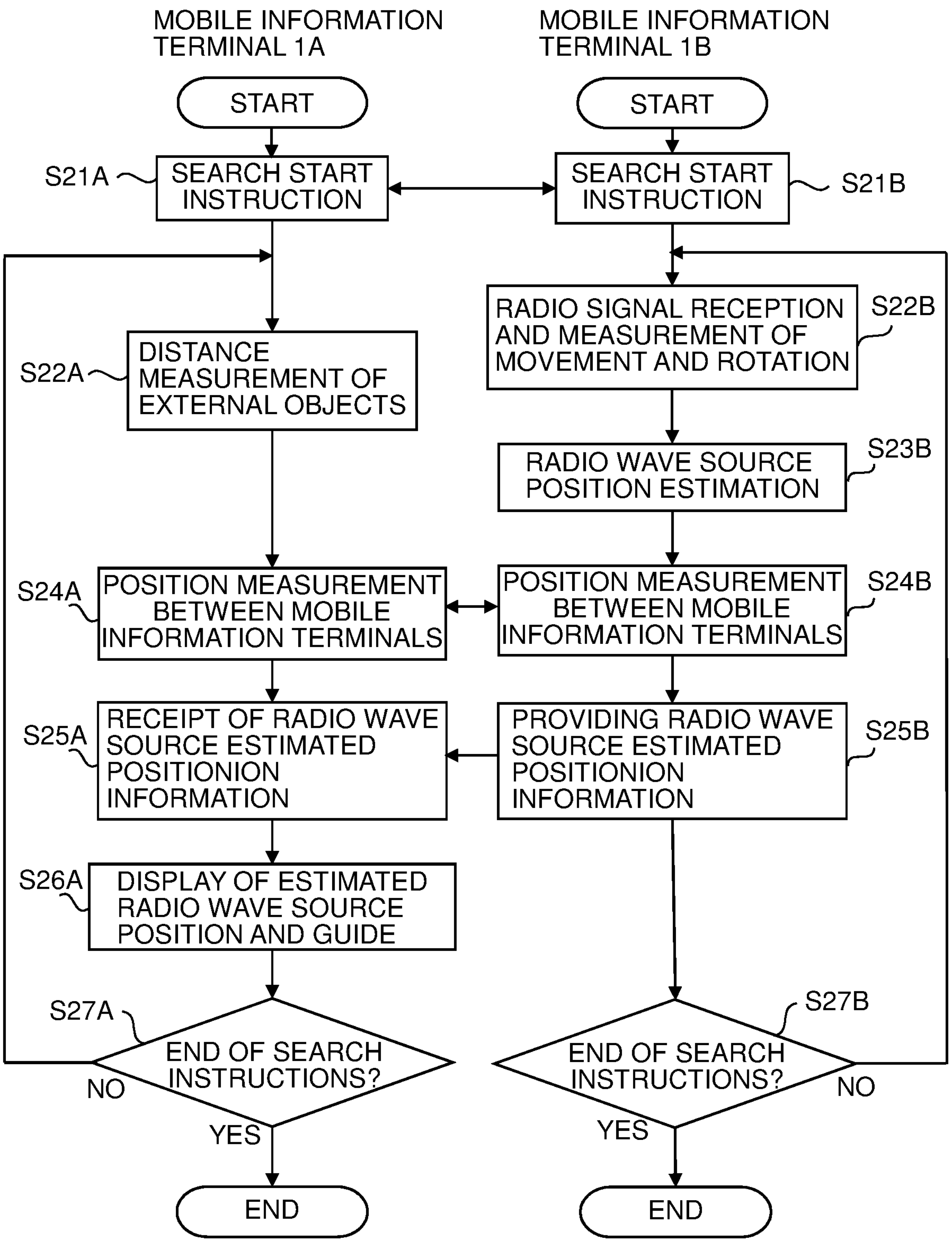
FIG. 13 is a processing flow diagram of the radio wave source search in Example 5.

FIG. 13 is a processing flow diagram of the radio wave source search in this example. In FIG. 13, mobile information terminal 1A is an HMD and mobile information terminal 1B is a smartphone. First, in steps S21A and S21B, user instructions to start the search can be given to either of the mobile information terminals, and the process of searching for radio wave sources in each of the mobile information terminals 1A and 1B starts when an instruction to start the search is triggered by communication between the terminals 1A and 1B.

In step S22B, the mobile information terminal 1B receives radio signals and measures the amount of movement and rotation of its own terminal as in step S2 described in FIG. 5. Then, in step S23B, the position of the radio wave source is estimated in the same way as in step S3 described in FIG. 5.

Next, in step S24B, the positional relationship between mobile information terminals 1A and 1B is measured. The corresponding process is also performed in step S24A for mobile information terminal 1A. Then, in step S25B, information of the radio wave source estimated position estimated in step S23B is transmitted to and provided to the mobile information terminal 1A.

After that, in step S27B, it is determined whether or not an instruction to end the search has been received, and the processes from step S22B to S25B are continued until the instruction to end the search is received, and the estimated position of the radio wave source is continuously updated. The user instruction to end the search may be given to either of the mobile information terminals, and by communication between the mobile information terminals 1A and 1B, the process of searching for the radio wave source of each of the mobile information terminals 1A and 1B is terminated with a search end instruction to one of the mobile information terminals serving as a trigger.

In step S22A, mobile information terminal 1A measures the distance of objects in the external world for displaying the shielding relationship. If the display of the guide does not reflect the shielding relationship, the measurement may not be necessary.

Next, in step S24A, the positional relationship between mobile information terminals 1A and 1B is measured, and in step S25A, information of the radio wave source estimated position transmitted from mobile information terminal 1B is received.

Then, in step S26A, based on the information on the positional relationship between mobile information terminals 1A and 1B, the radio wave source estimated position transmitted from mobile information terminal 1B is converted to the radio wave source estimated position in the coordinate system of mobile information terminal 1A, and the estimated position of the radio wave source and the guide are displayed similar to step S4 described in FIG. 5.

After that, in step S27A, the process of steps S22A through S26A is continued until an instruction to end the search is received, and the display of the estimated position of the radio wave source and the guide continue to be updated.

Although the cooperative relationship between mobile information terminals is not shown in FIG. 1, the processing may be distributed among multiple mobile information terminals, as in this example. If the relative positional relationship between mobile information terminals is known, the reception processing of radio waves may also be performed cooperatively.

As described above, in this example, the position of the radio wave source can be intuitively grasped by displaying it on the HMD. In addition, by using a smartphone to perform the position estimation calculations, the processing burden on the HMD can be lightened.

Example 6

In this example, a display example in which the display area of the radio wave source estimated position and the guide are small will be described.

Figure 14A:
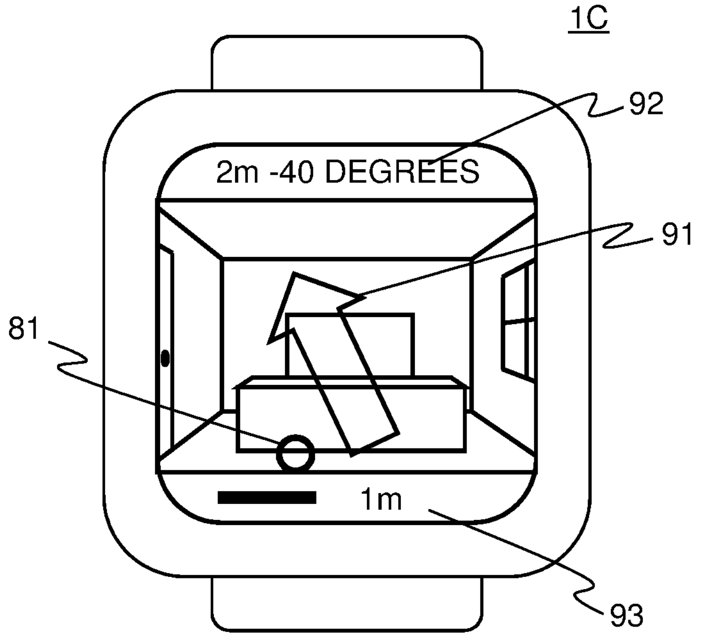
FIG. 14A is a display example of the radio wave source estimated position when the mobile information terminal is a smart watch in Example 6.

FIG. 14A is a display example of the radio wave source estimated position when the mobile information terminal is a smart watch in this example. In FIG. 14A, in the case of a mobile information terminal with a small display area, such as smart watch 1C, in order not to make the guide display small and difficult to see, the tip of the guide display as shown in FIG. 2B is not displayed so as to match the radio wave source estimated position. That is, in FIG. 14A, the smart watch 1C does not align the tip of the guide 91 with the radio wave source estimated position, with respect to the radio wave source estimated position 81, the guide 91 is displayed with the position of the smart watch 1C as a reference, the depth direction upward, the front direction downward, the left and right directions inclined to the left and right, and an intuitive sense to the radio wave source estimated position is displayed in the form of a guide (here, an arrow). In other words, the direction of the arrow indicates the direction of the radio wave source, and the length indicates the distance to the radio wave source. As shown in FIG. 14A, the distance and angle to the radio wave source estimated position may be displayed as indicated by 92. Alternatively, as indicated by 93, a scale may be displayed as a measure of the length of the guide 91.

Figure 14B:
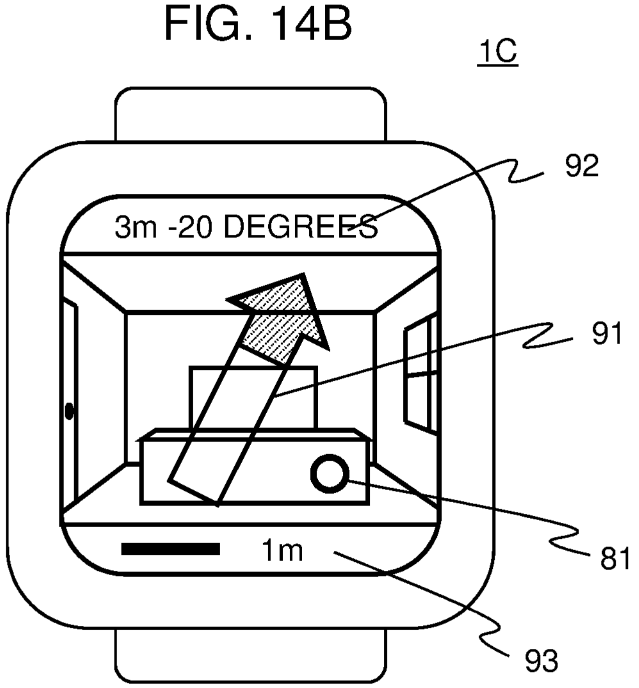
FIG. 14B is a display example of the radio wave source estimated position when the radio wave source is located in a position shielded by a structure in FIG. 14A.

FIG. 14B is a display example of the radio wave source estimated position when the position of the radio wave source changes in FIG. 14A and the radio wave source is located at a position shielded by a structure. As shown in FIG. 14B, when the radio wave source is in a shielded position, the arrow tip portion of guide 91 is shaded and the display form of the arrow tip portion is changed.

The image of the external world that is displayed with the guide 91 superimposed is an image from the user's viewpoint and contains a radio wave source. And this image does not have to have been taken at the time of the guide display. Furthermore, it may have been taken by an other terminal.

Figure 15A:
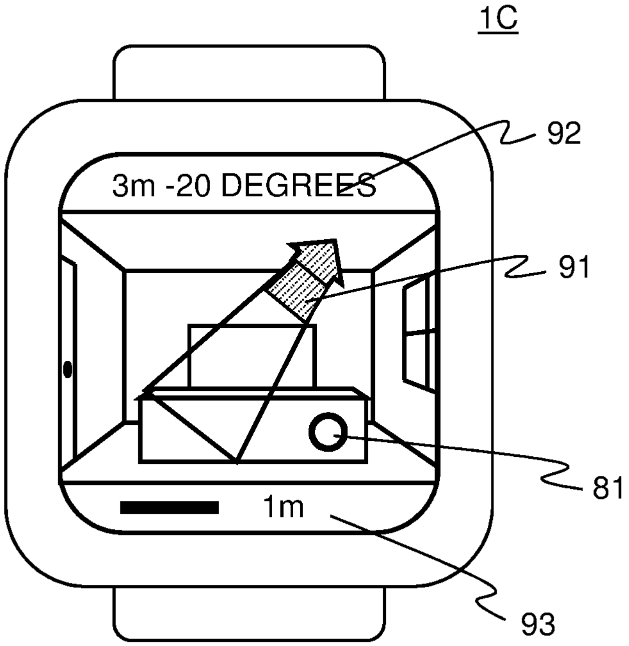
FIG. 15A is another display example of the radio wave source estimated position when the mobile information terminal is a smart watch in Example 6.
Figure 15B:
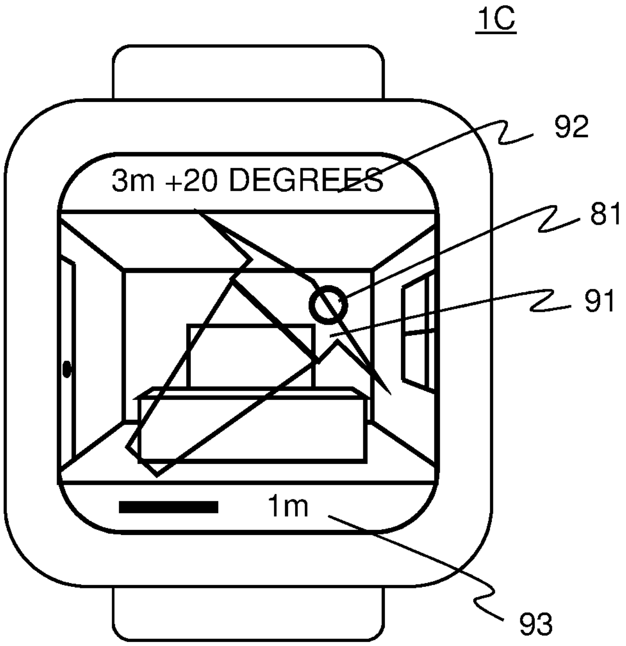
FIG. 15B is a display example of the radio wave source estimated position when the radio wave source is in the upward direction in FIG. 15A.

FIG. 15A is another display example of the radio wave source estimated position when the mobile information terminal is a smart watch in this example. In FIG. 15A, the same configuration as in FIG. 14A is marked with the same symbol and its explanation is omitted. In FIG. 15A, the difference from FIG. 14A is that the smart watch 1C indicates whether the direction of the radio wave source is downward or upward with respect to the horizontal or display surface of the smart watch 1C by the shape of the arrow of the guide 91, which is tapered or thickened. In other words, in FIG. 15A, the arrow is tapered, indicating that the radio wave source is in the downward direction. FIG. 15B is an example of an indication that the radio wave source is in the upward direction.

Instead of the shape of the arrow being tapered or thickened, it may be displayed in a distinguishable manner, such as by changing the color. In addition, the mode of display may be changed, for example, by changing the change rate of thickening by inclination. As a result, even with a small display screen, there is an effect that the height at which the radio wave source is positioned can be estimated.

Also, when the tilt with respect to the horizontal plane is displayed, the height can be found by changing the height of the smart watch 1C and searching for the height indicating the horizontal plane. Further, when the inclination with respect to the display surface is displayed, the position of the radio wave source can be intuitively understood by changing the inclination of the display surface and searching for the angle at which the inclination of the arrow with respect to the display surface is 0.

Example 7

In this example, an example will be described in which both terminals can estimate the terminal position of the other party when both persons are carrying mobile information terminals having a radio wave source search function.

Figure 16:
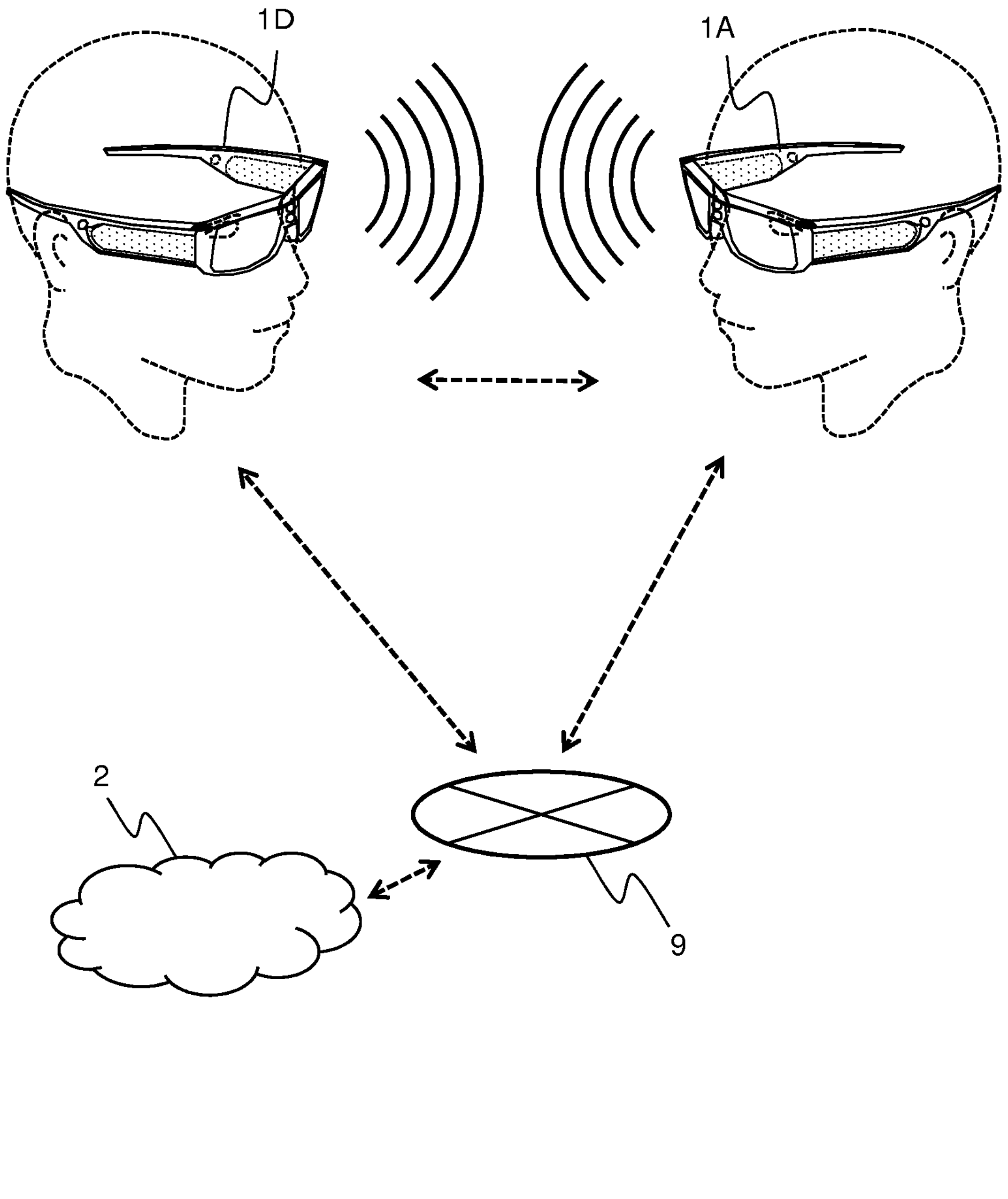
FIG. 16 is a schematic configuration diagram of an other terminal searching system in Example 7.

FIG. 16 is a schematic configuration diagram of the radio wave source search system in this example. In FIG. 16, the same configuration as in FIG. 1 is marked with the same symbol, and its explanation is omitted. In FIG. 16, the difference from FIG. 1 is that mobile information terminals 1A and 1D, which are HMDs, have a radio wave source search function, and both have the ability to estimate the position of the other party's terminal.

Figure 17A:
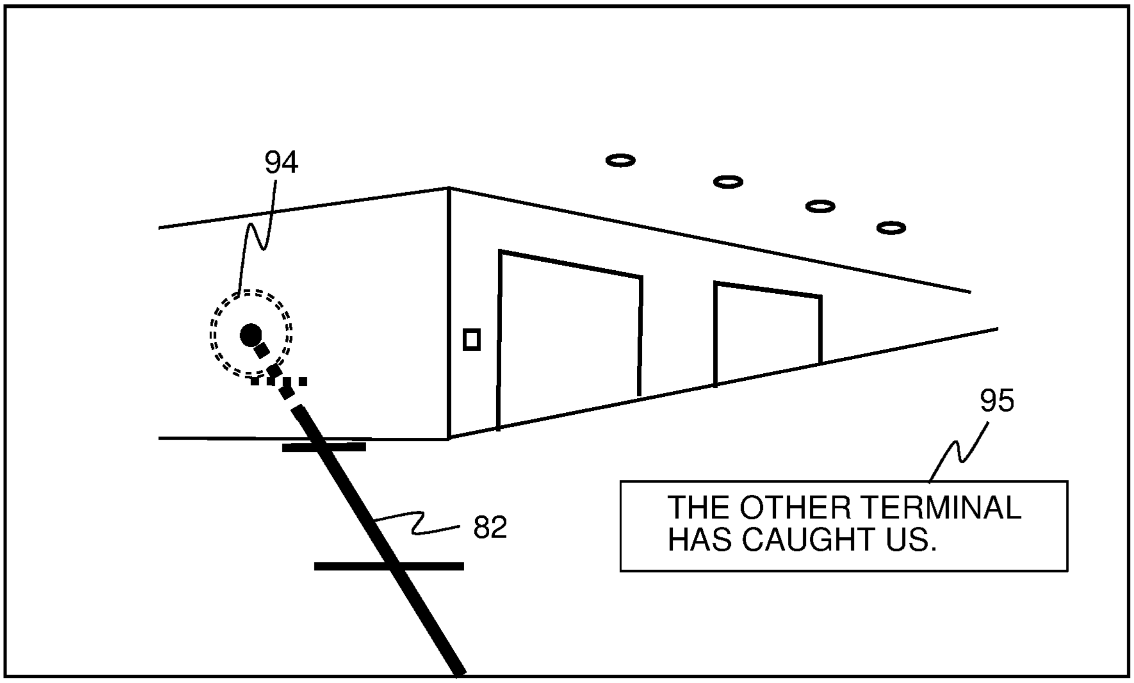
FIG. 17A is a display example of the other terminal estimated position in Example 7.

FIG. 17A is a display example of an other terminal estimated position in this example. In FIG. 17A, the other terminal estimated position 94 is displayed, as well as an indication 95 of whether the other terminal has captured its own terminal, i.e., whether the location estimation was done with sufficient accuracy. This allows the user to understand the status of the other terminal.

Figure 17B:
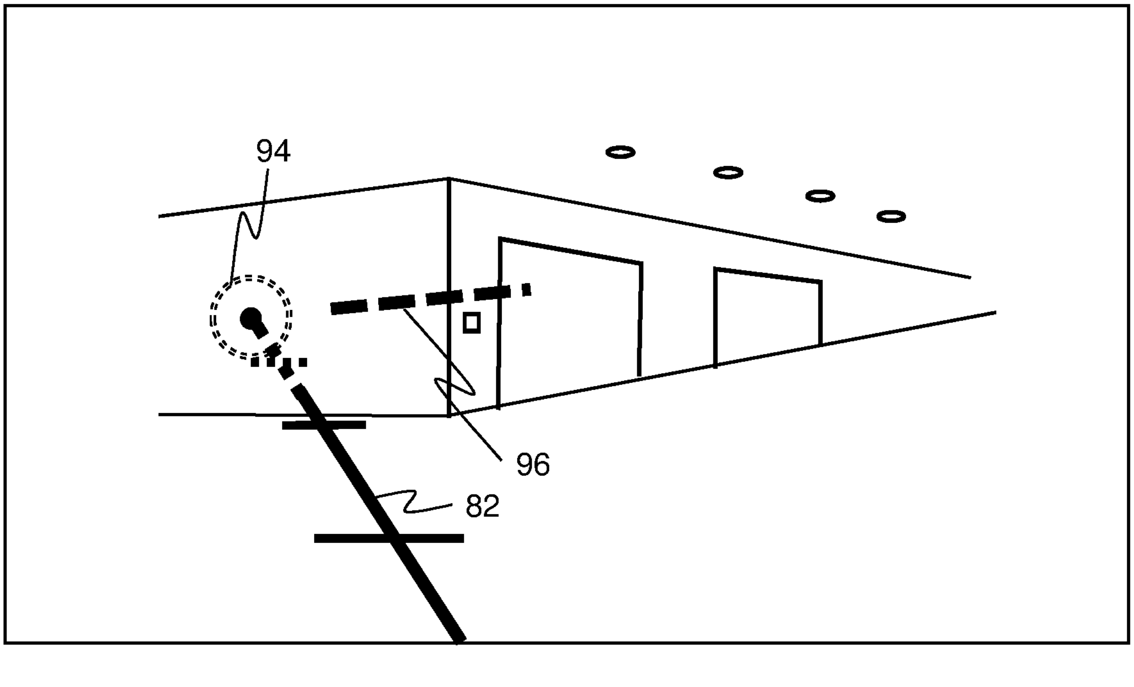
FIG. 17B is another display example of the other terminal estimated position in Example 7.

FIG. 17B is another display example of the other terminal estimated position in this example. In FIG. 17B, the other terminal estimated position 94 is displayed, and the movement history 96 of the other terminal is also displayed. Although the movement history can be obtained from the own terminal's measurement results alone, if movement information can be obtained from the other terminal, changes in the estimated position can be precisely determined.

Figure 18:
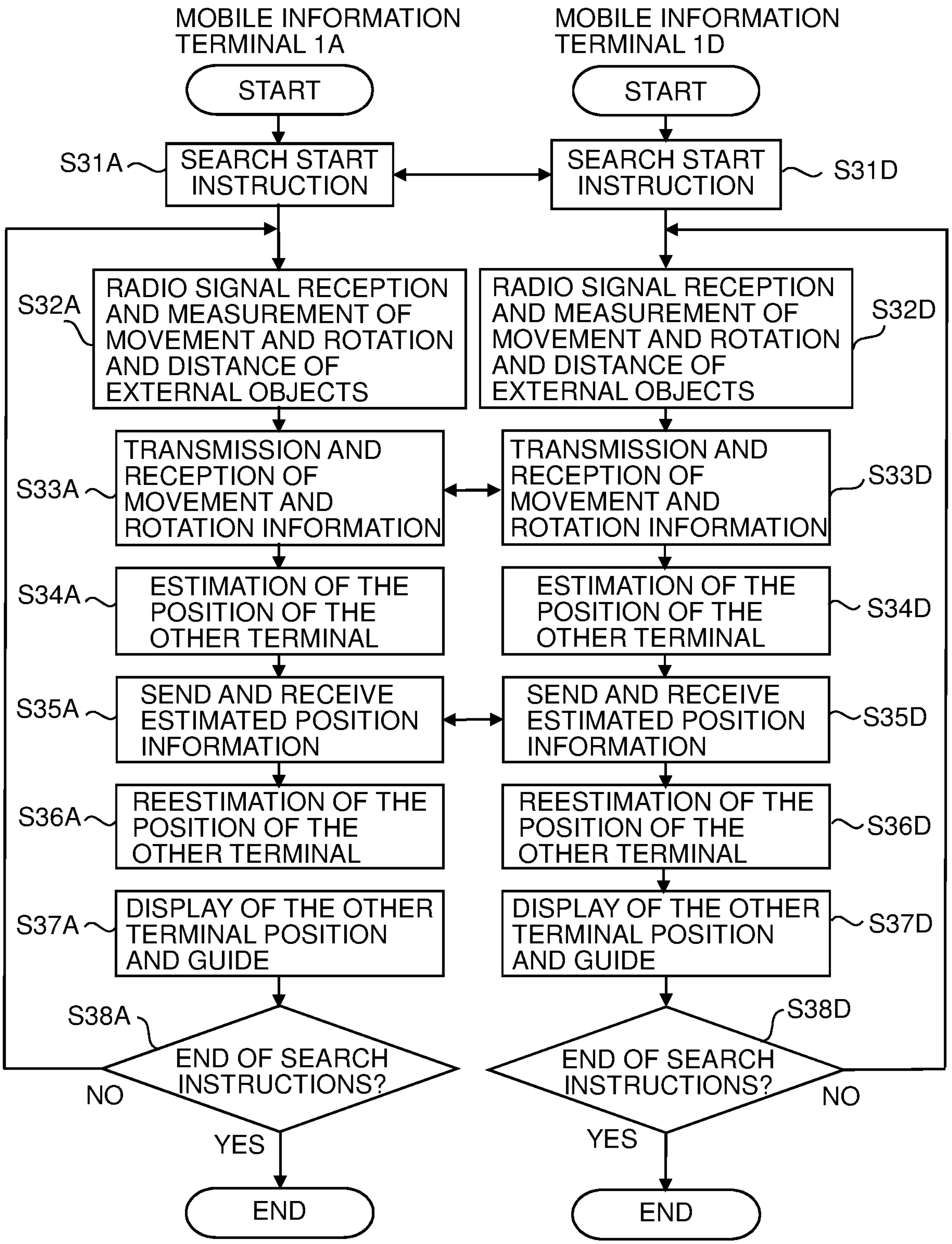
FIG. 18 is a processing flow diagram of an other terminal search in Example 7.

FIG. 18 is a processing flow diagram of an other terminal search in this example. In FIG. 18, first, in steps S31A and S31D, user instructions to start the search may be given to either of the mobile information terminals, and the process of searching for the other terminal for each of the mobile information terminals 1A and 1D begins by triggering a search start instruction to one of the mobile information terminals through communication between the mobile information terminals 1A and 1D.

The subsequent process of searching for the other terminal for each of the mobile information terminals 1A and 1D is similar, so the process for mobile information terminal 1A will be described on behalf of mobile information terminals 1A and 1D.

In step S32A, mobile information terminal 1A receives radio signal and measures the amount of movement and rotation of its own terminal and the distance to an external world object, similar to step S10 described in FIG. 9. Then, in step S33A, transmission and reception of the movement amount and rotation amount information is performed with the mobile information terminal 1D. Then, in step S34A, the terminal position of the mobile information terminal 1D is estimated by the same process as in step S3 described in FIG. 5 by combining the movement amount and rotation amount information of the mobile information terminal 1D.

The next steps S35A and 36A are processes to further improve the estimation accuracy by using the position estimation data of the own terminal from the perspective of the other terminal. In other words, the estimation of the new position of the other terminal yields the inter-terminal vector V1 with the own terminal position as the starting point and the other terminal position as the ending point. Similarly, a terminal-to-terminal vector V2 is obtained from the measurement of the other terminal. If these two vectors are converted to values in the same coordinate system, they should be opposite vectors if there is no error in position estimation. The relationship between the coordinate systems of the two terminals is known through data exchange in past position measurements, including data on the amount of rotation of each terminal, so the inter-terminal vector measured by the other terminal can be converted to the value of its own terminal. Therefore, for both terminals, the error Δ can be estimated from the sum of these two vectors, as in the following equation.

$$\Delta = (V1 + V2)/2$$

Therefore, in step S35A, the estimated position information is transmitted and received between the mobile information terminals to obtain the other terminal position information. Then, in step S36A, the other terminal position is re-estimated, taking this error Δ into account. The inter-terminal vector V1' resulting from the re-estimation is as follows.

$$V1' = V1 - \Delta = (V1 - V2)/2$$

This error correction is not only for errors caused by the radio wave source measurement, but also for errors caused by the measurement of the movement and rotation of the own terminal. If there is no need to improve the estimation accuracy, this re-estimation may not be performed. In that case, steps S35A and 36A are skipped.

Next, in step S37A, the estimated position of the other terminal and the display of the guide are displayed, a process similar to step S4 described in FIG. 5. Thereafter, in step S38A, it is determined whether or not an instruction to end the search has been received, and the processes from steps S32A to S37A are continued until the instruction to end the search is received, and continues updating the display of the estimated position of the other terminal and the display of the guide.

Thus, according to this example, when estimating the terminal position of the partner, the position of the own terminal from the perspective of the other terminal is the position of the other terminal from the perspective of the own terminal if the vector direction is changed, so the estimation accuracy can be improved by combining the estimation results of both. In addition, by acquiring the movement history, past estimation results can also be used as data for current position estimation, and the estimation accuracy can be improved.

Example 8

In this example, an example in which other search methods are used together will be described.

Figure 19A:
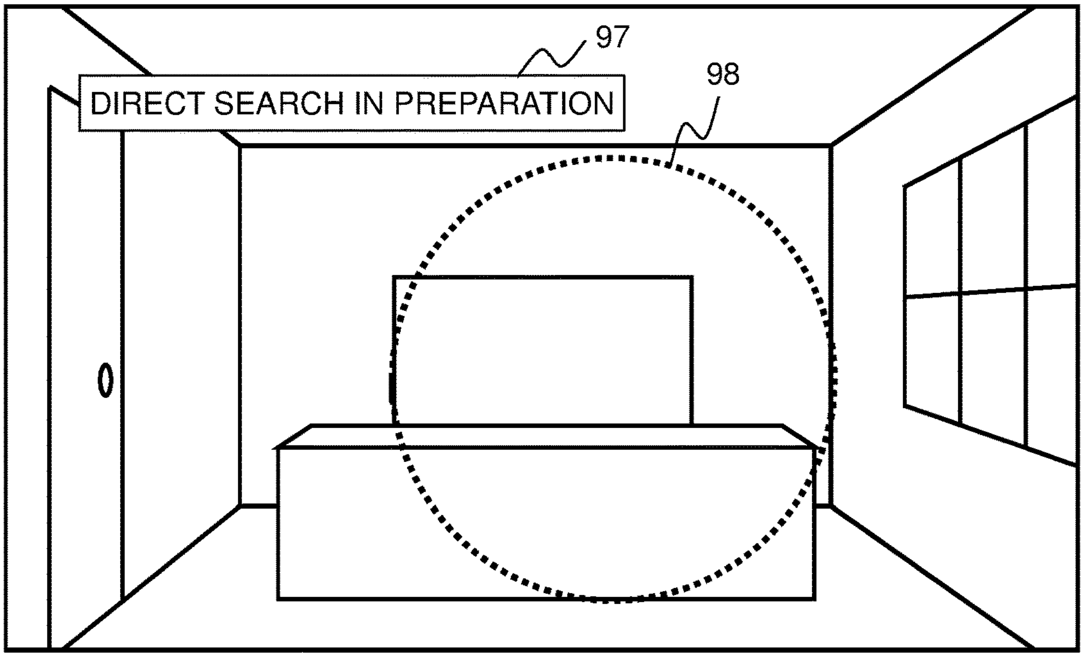
FIG. 19A is a display example of the radio wave source estimated position in Example 8.

FIG. 19A is a display example of the radio wave source estimated position in this example. In FIG. 19A, for example, if the accuracy of direct radio wave source estimation by radio reception of the mobile information terminal is low due to a small number of data, distance, etc., the mobile information terminal 1 first estimates the position of the radio wave source based on the external world using a positioning technique such as indoor positioning, which is another search method, that is, performs an indirect search. In FIG. 19A, during the indirect search, a display such as direct search in preparation 97 is displayed, and the mark indicating the radio wave source estimated position is also displayed as a radio wave source estimated position 98 indicating a wide range that is an approximate position.

Figure 19B:
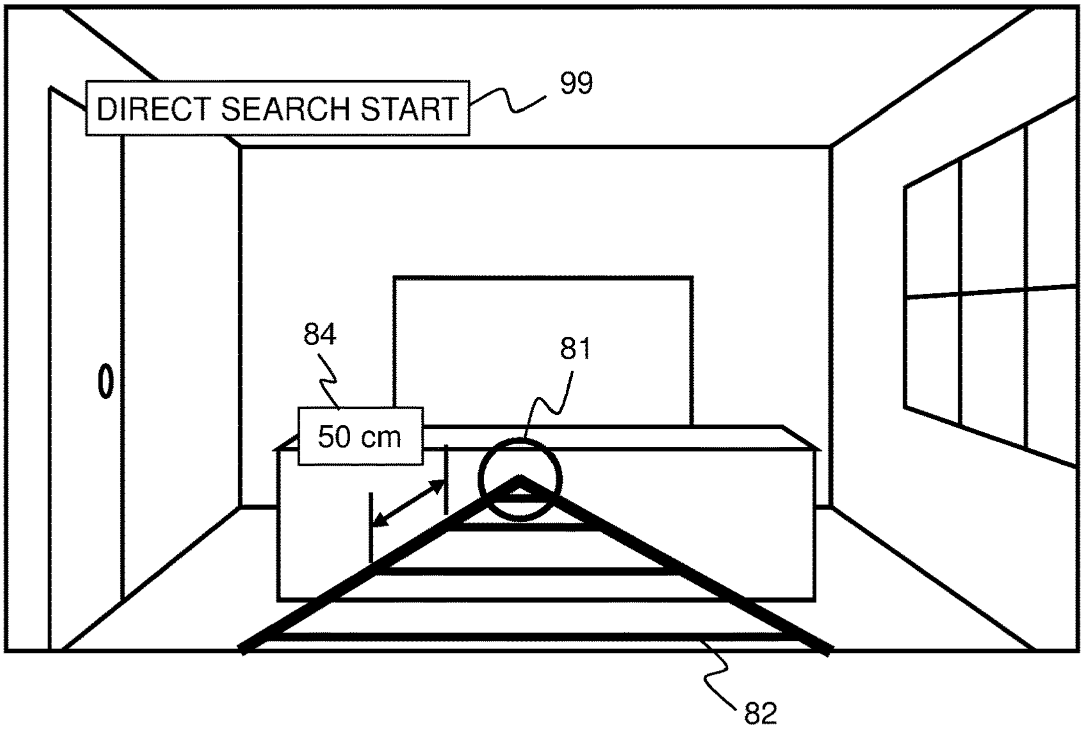
FIG. 19B is a display example of the radio wave source estimated position when the accuracy of position estimation of the radio wave source is improved in FIG. 19A.

FIG. 19B is a display example of the radio wave source estimated position when the accuracy of position estimation of the radio wave source is improved in FIG. 19A. In FIG. 19B, the display is switched to the display of the estimated position by direct search when the estimation accuracy has increased, either by increasing the number of data or by getting closer to the radio wave source position based on indirect estimation information. In other words, as shown in FIG. 19B, a display of direct search start 99 is displayed, and the same as in FIG. 2A, the radio wave source estimated position 81 with improved estimation accuracy and a guide 82 are displayed.

Figure 20:
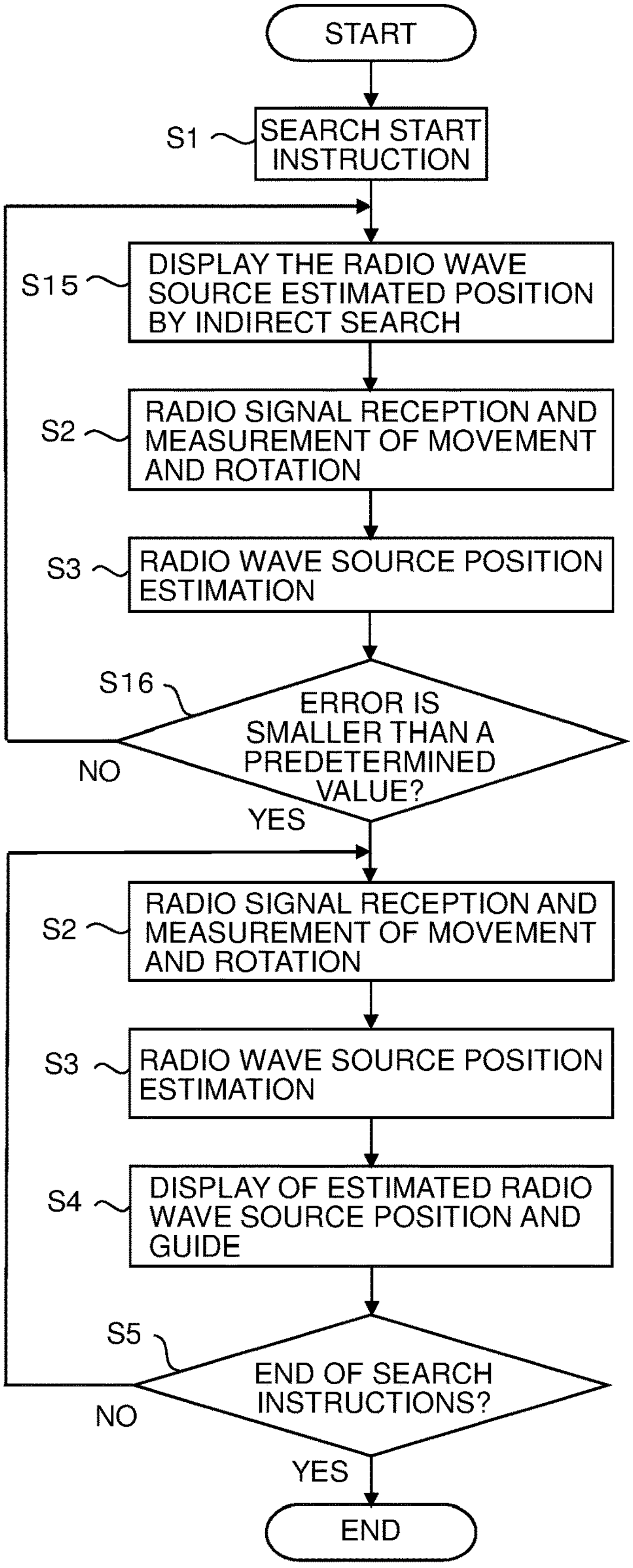
FIG. 20 is a processing flow diagram of radio wave source search in Example 8.

FIG. 20 is a processing flow diagram of radio wave source search in this example. In FIG. 20, the same processes as in FIG. 5 are indicated with the same symbols, and their explanations are omitted. In FIG. 20, when mobile information terminal 1 receives a search start instruction in step S1, it performs position estimation of the radio wave source by indirect search, which is another search method, in step S15, and displays the radio wave source estimated position that shows a wide range, which is a rough location, as shown in FIG. 19A. Then, in step S2 similar to FIG. 5, the radio signals from the direct search are received and the amount of movement and the amount of rotation of the own terminal are measured. Then, in step S3, the position of the radio wave source is estimated, and in step S16, it is determined whether or not the estimated position error is smaller than a predetermined value. If not, it is determined that the estimation accuracy is low, and the process returns to step S15 to repeat the radio wave source position estimation by indirect search until the estimation accuracy reaches the predetermined accuracy. Then, when the estimation accuracy reaches or exceeds a predetermined accuracy, in steps S2 and S3, the radio signal reception, the measurement of the amount of movement and rotation of the own terminal, and the estimation of the position of the radio wave source are updated, and switches to displaying the estimated position by direct search in step S4, and the radio wave source estimated position 81 and the guide 82 shown in FIG. 19B are displayed. Then, the process of steps S2 to S4 is continued until an instruction to end the search is received, and the display of the estimated position of the radio wave source and the display of the guide continue to be updated.

Thus, in this example, the search can be performed efficiently because the estimated position can be estimated from the stage where the accuracy of the position estimation of the radio wave source by direct search is low. This method is also effective for rendezvous and other situations. That is, initially, the user heads for the meeting place based on map information, and once in close enough proximity to receive radio waves, the final precise position estimation by the radio wave source search can be used to more efficiently meet the target person.

Examples have been described, but the Examples have been described in detail to make the present invention understandable, and are not necessarily limited to having all the configurations described above. In addition, a part of the configuration of one Example can be replaced with the configuration of other Examples, and the configuration of other Examples can also be added to the configuration of one Example. In addition, the addition, the deletion, and the replacement of other configurations can be performed with respect to a part of the configuration of each Example.

REFERENCE SIGNS LIST

1, 1A to 1D Mobile information terminal
9 Communication network
10 Housing
11 Display surface
101 Processor
102 Memory
103 Display device
107 Operation input unit
80 Radio wave source
81 Radio wave source estimated position
82 Guide
87 First radio wave source estimation position
88 Second radio wave source estimation position
91 Guide
94 Other terminal estimated position
96 Movement history

The invention claimed is:

1. A mobile information terminal, comprising:
a wireless communication interface configured to receive a radio signal of a radio wave source;
a sensor configured to measure an amount of movement and an amount of rotation of the mobile information terminal;
a display; and
a processing circuit,
wherein the processing circuit is configured to:
estimate a position of the radio wave source from the radio signal received by the wireless communication interface, and the amount of movement and the amount of rotation of the mobile information terminal measured by the sensor,
display, on the display, a graphical guide display superimposed on an external world image, the graphical guide display expressing a three-dimensional direction and distance representing a relative positional relationship of the estimated position of the radio wave source as viewed from the position of the mobile information terminal, and
display an error range of the estimated position of the radio wave source, including differences depending on three-dimensional directions.

2. The mobile information terminal according to claim 1, wherein a tip of the graphical guide display overlaps the display of the estimated position of the radio wave source.

3. The mobile information terminal according to claim 1, wherein a tip of the graphical guide display does not overlap the display of the estimated position of the radio wave source.

4. The mobile information terminal according to claim 1, wherein the graphical guide display is a display that also reflects a shielding relationship with a physical object in the external world.

5. The mobile information terminal according to claim 1, wherein the estimated position of the radio wave source is calculated by a server.

6. The mobile information terminal according to claim 1, wherein the processing circuit is configured to display guidance for reducing an error in the estimated position of the radio wave source.

7. The mobile information terminal according to claim 1, wherein the processing circuit is configured to display estimated positions of a plurality of radio wave sources, and change the form of the graphical guide display according to the distance difference between the estimated positions of the plurality of radio wave sources.

8. The mobile information terminal according to claim 1, wherein the processing circuit is configured to display a movement direction to the estimated position of the radio wave source.

9. The mobile information terminal according to claim 1, wherein the processing circuit is configured to display a movement history of the position of the radio wave source.

10. A mobile information terminal, comprising:
a first communication interface configured to receive a radio signal of a radio wave source;
a second communication interface configured to communicate with another mobile information terminal;
a sensor configured to measure an amount of movement and an amount of rotation of the mobile information terminal;
a display; and
a processing circuit,
wherein the processing circuit is configured to:
estimate a position of the radio wave source from the radio signal received by the first communication interface, and the amount of movement and the amount of rotation of the mobile information terminal measured by the sensor,
display, on the display, a graphical guide display superimposed on an external world image, the graphical guide display expressing a three-dimensional direction and distance representing a relative positional relationship of the estimated position of the radio wave source as viewed from the position of the mobile information terminal,
in response to obtain position information and estimated position information of the radio wave source transmitted from the other mobile information terminal via the second communication interface, measure a positional relationship with the other mobile information terminal by using the position information, and
based on the positional relationship, convert the estimated position information of the radio wave source transmitted from the other mobile information terminal into the estimated position of the radio wave source in a coordinate system of the mobile information terminal, and display the graphical guide display.

11. A mobile information terminal according to claim 10, wherein a tip of the graphical guide display overlaps the display of the estimated position of the radio wave source.

12. A mobile information terminal according to claim 10, wherein a tip of the graphical guide display does not overlap the display of the estimated position of the radio wave source.

13. A mobile information terminal according to claim 10, wherein the graphical guide display is a display that also reflects a shielding relationship with a physical object in the external world.

14. A mobile information terminal according to claim 10, wherein the estimated position of the radio wave source is calculated by a server.

15. A mobile information terminal according to claim 10, wherein the processing circuit is configured to display guidance for reducing an error in the estimated position of the radio wave source.

16. A mobile information terminal according to claim 10, wherein the processing circuit is configured to display the estimated positions of a plurality of radio wave sources, and change the form of the graphical guide display according to the distance difference between the estimated positions of the plurality of radio wave sources.

17. A mobile information terminal according to claim 10, wherein the processing circuit is configured to display a movement direction to the estimated position of the radio wave source.

18. A mobile information terminal according to claim 10, wherein the processing circuit is configured to display a movement history of the position of the radio wave source.

19. A mobile information terminal according to claim 10, wherein the processing circuit is configured to display an error range of the estimated position of the radio wave source, including differences depending on three-dimensional directions.

* * * * *